United States Patent [19]

Schindel et al.

[11] Patent Number: 4,536,064

[45] Date of Patent: Aug. 20, 1985

[54] CLEAR VIEW SCREEN

[75] Inventors: Arnold Schindel, Fairlawn; Edward Higgins, Jr., Madison, both of N.J.

[73] Assignee: The Singer Company, Little Falls, N.J.

[21] Appl. No.: 576,843

[22] Filed: Feb. 3, 1984

[51] Int. Cl.³ .......................... G02B 11/08; E06B 7/00
[52] U.S. Cl. .................................. 350/583; 15/250.22; 52/171
[58] Field of Search ................ 350/583, 588; 310/104; 15/250.22, 250.29; 52/171

[56] References Cited

U.S. PATENT DOCUMENTS

| 2,383,750 | 8/1945 | Smith | 350/588 |
| 2,707,298 | 5/1955 | Wiest, Jr. | 15/250.29 |
| 3,103,712 | 9/1963 | Allinikov et al. | 52/171 |
| 3,188,700 | 6/1965 | Herrmann et al. | 52/171 |
| 3,196,302 | 7/1965 | Dechet | 310/104 |
| 3,299,819 | 1/1967 | McCoy | 310/104 |
| 3,688,081 | 8/1972 | Speich | 15/250.22 |

FOREIGN PATENT DOCUMENTS 326041 4/1935 Italy ........................................ 52/171

Primary Examiner—William H. Punter
Attorney, Agent, or Firm—T. W. Kennedy

[57] ABSTRACT

In a clear viewing screen of the kind comprising a fixed screen element; a disk-like screen element supported for rotation at the outside of the window; a motor for driving the rotatable disk-like screen element supported at the inside of the fixed screen element; the motor to coupled the rotatable disk-like screen element, the motor mounted at the periphery of said rotatable disk-like screen element, and a magnetic coupling having first and second coupling halves is provided, one coupling half coupled to the motor, and the other coupling half coupled to the rotatable disk-like screen element, the coupling members disposed opposite each other on opposite sides of the fixed screen element so that coupling can take place without making a hole in the fixed screen element.

5 Claims, 3 Drawing Figures

CLEAR VIEW SCREEN

This invention relates to clear viewing screens for vehicles, particularly for ships, boats, airplanes and other vehicles in general and more particularly to an improved clear viewing screen of the type comprising two parallel screen elements of transparent material, one of which is rotatable so as to throw off, by centrifugal action, any water or other material which might otherwise accumulate thereon.

Screens, known as clear viewing screens or clear view screens have been developed. In the typical screen of this nature a motor is mounted in or on the windshield of a ship, for example. Secured to the motor is a clear disk or driven screen, the driven screen being external to the main window. This spinning window is sealed at its edges with labyrinths or seals to prevent leakage into the space between the main windshield and the spinning window. Water or other material which would otherwise accumulate on the wind screen is thrown off by centrifugal force from the spinning window attached to the motor.

In this prior art device which is disclosed for example in U.S. Pat. No. 3,688,081 and U.S. Pat. No. 3,429,086, the motor is located in a central area thereby blocking the field of view right in the center of the spinning window. Furthermore, the motor or a motor shaft must pass through an opening in the window thereby increasing mounting and sealing problems.

It is thus an object of the present invention to provide an improved screen of this nature in which problems of sealing the main windshield are reduced or eliminated.

It is also an object to provide an enlarged field of view in such a device.

SUMMARY OF THE INVENTION

In accordance with the present invention, the spinning window or screen external to the main windshield is driven by a motor located on the inside of the windshield with coupling between the motor and the spinning window accomplished magnetically through the glass of the windshield. In this way, there is no hole in the main window eliminating the need for sealing, avoiding leakage and allowing the main window to be uniformly heated.

In accordance with a further embodiment of the present invention, the motor and magnetic coupling are located at the periphery of the rotating disk. Thus, in this embodiment there is no distortion or disruption because of the hole and, because of the location of the motor, at the periphery of the window, vision is not limited to an annular area surrounding the driving motor but encompasses the full field of the spinning window.

DETAILED DESCRIPTION OF THE INVENTION

Figure 1:
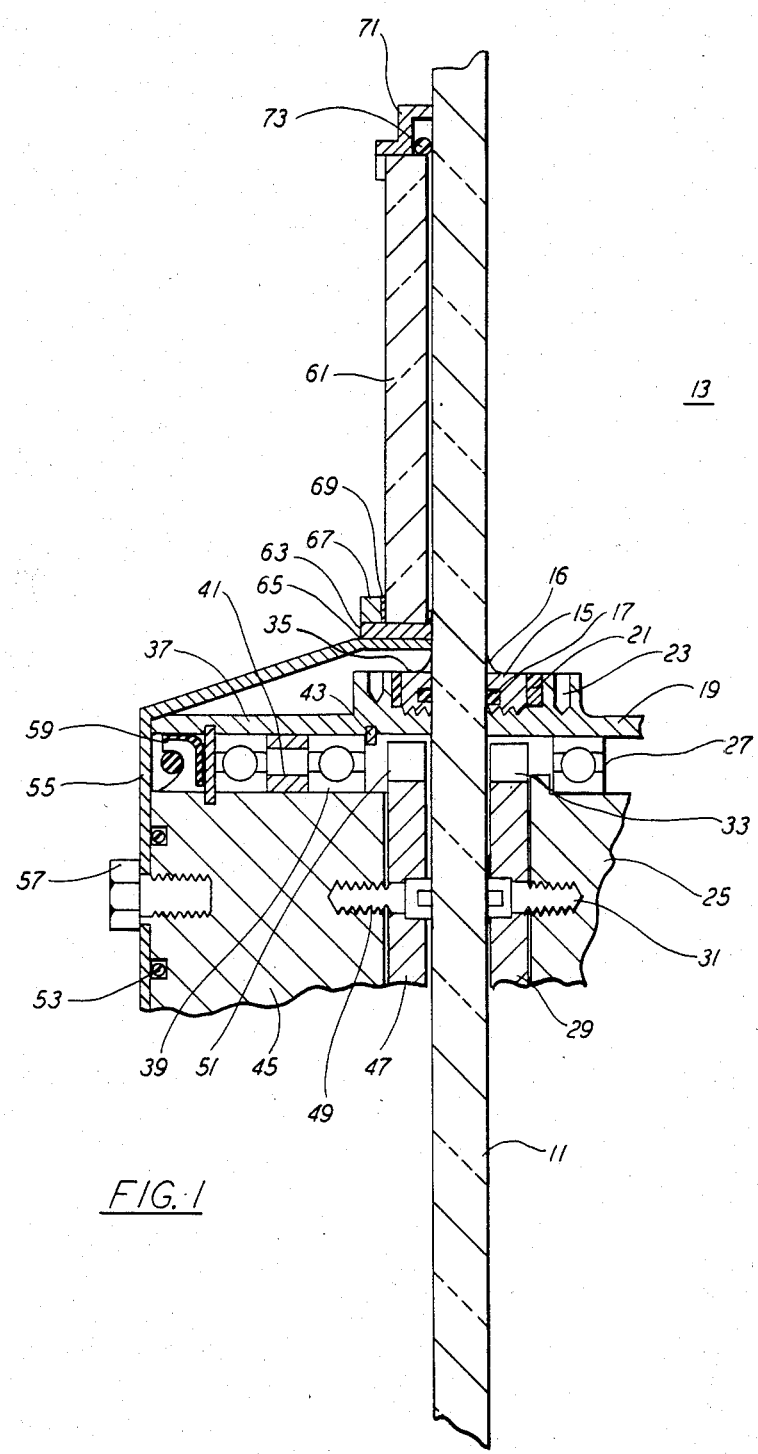
FIG. 1 is a cross-sectional view of a portion of a first embodiment of clear viewing screen according to the present invention.

FIG. 1 is a partial cross-sectional view of a first embodiment of the present invention with a motor and coupling mechanism mounted centrally with respect to the viewing area at a windshield 11. On the inside or bridge side 13 of the windshield 11 is mounted on adaptor ring 15. The adaptor ring 15 contains a groove 17 on the side facing the windshield 11. It is glued to the windshield 11 with glue filling the groove, on the face of the ring 15 and forming fillets 16 on each side of the ring. The ring 15 is utilized to support a motor housing 19 containing matching threads which screws into the ring 15 with a spacer 21 providing proper adjustment and ensuring a proper seated position of the housing 19 when threaded into the adaptor ring 15 so that a connector, not shown, will be at the proper angular orientation to coincide with a mating plug to supply power to the motor in conventional fashion. A plurality of bores 23 are provided in the housing to permit engagement by a spanner for insertion and removal of housing 19.

The rotor 25 of the motor is supported on bearing 27 within the housing 19. The rotor has attached to it a driving magnet ring 29 of non-magnetic material, attachment being by means of a cap screw 31. Mounted to magnet ring 29 are permanent magnet elements 33 preferably high flux density samarium cobalt, for example, arrayed in alternate polarity segments axially aligned to interface with a similar ring on the opposite side of the fixed windshield 11.

A similar structure exists on the other side of the window. An adapter 35 is glued to the window opposite an adapter ring 15 in similar fashion. Mounted to the adapter ring 35 is a housing 37 which in turn mounts a ball bearing structure comprising two sets of ball bearings 39 axially spaced by rings 41 and retained and located by lock rings 43. Bearings 39 support a shaft 45 for rotation. A magnet ring 47 of nonmagnetic material is secured to shaft 45 by means of a cap screw 49. Magnets 51 are disposed on the outer periphery of the ring 47 so that the rotation of rotor 25 will be coupled from the magnets 33 to the magnets 51 causing rotation of shaft 45 thereby transmitting torque through the hermetically sealed fixed window 11.

Mounted to the end of the rotor 45 and sealed thereto by a sealing ring 53 is a rotating shield 55. It is held in place on the shaft 45 by means of a bolt 57. In addition, between the rotating shield 55 and the bearings, acting between the rotor 45 and housing 37, is a seal 59 which prevents any seepage at the rotor from reaching the bearings and magnets.

Mounted to the shield 55 is the rotating window 61. The rotating window 61, which will be of annular shape, shoulders against a ring element 63 which is welded to rotating shield 55 at point 65. Sealant is applied at the glass and metal interface during assembly. The glass is secured in place by means of a threaded ring 67 with a sealing washer 69 between the ring 67 and the window 61.

Mounted at the periphery of the rotating window 61 is a seal adapter 71. It encloses a peripheral seal 73 of a soft durometer "O-ring" molded around a helical spring as a continuous loop with its ends nested. The surface of the seal adapter 71 contacting the peripheral seal is scored with radial scratches to provide a drive coupling means with the seal 73. The purpose of the seal is to preclude leakage and passage in and out of the chamber between the windows 61 and 11 of air of varying humidity during static conditions, i.e., when the window is not running which might create steaming or fog or deposited moisture. When the motor is energized and the outer window is driven, centrifugal action, which tends to drive moisture, rain, snow etc. off the spinning window wall 61, because of the disposition of the seal 73, cause it to "grow" in diameter and, guided by the radial scores, free itself from its sealing function, thereby eliminating friction against the window which would reduce the ability of the drive to attain operating speed. In this regard, the seal is a useful element and, for example, may be used with other spinning devices such as prior art clear view screens where direct rather than magnetic coupling is accomplished.

Figure 2:
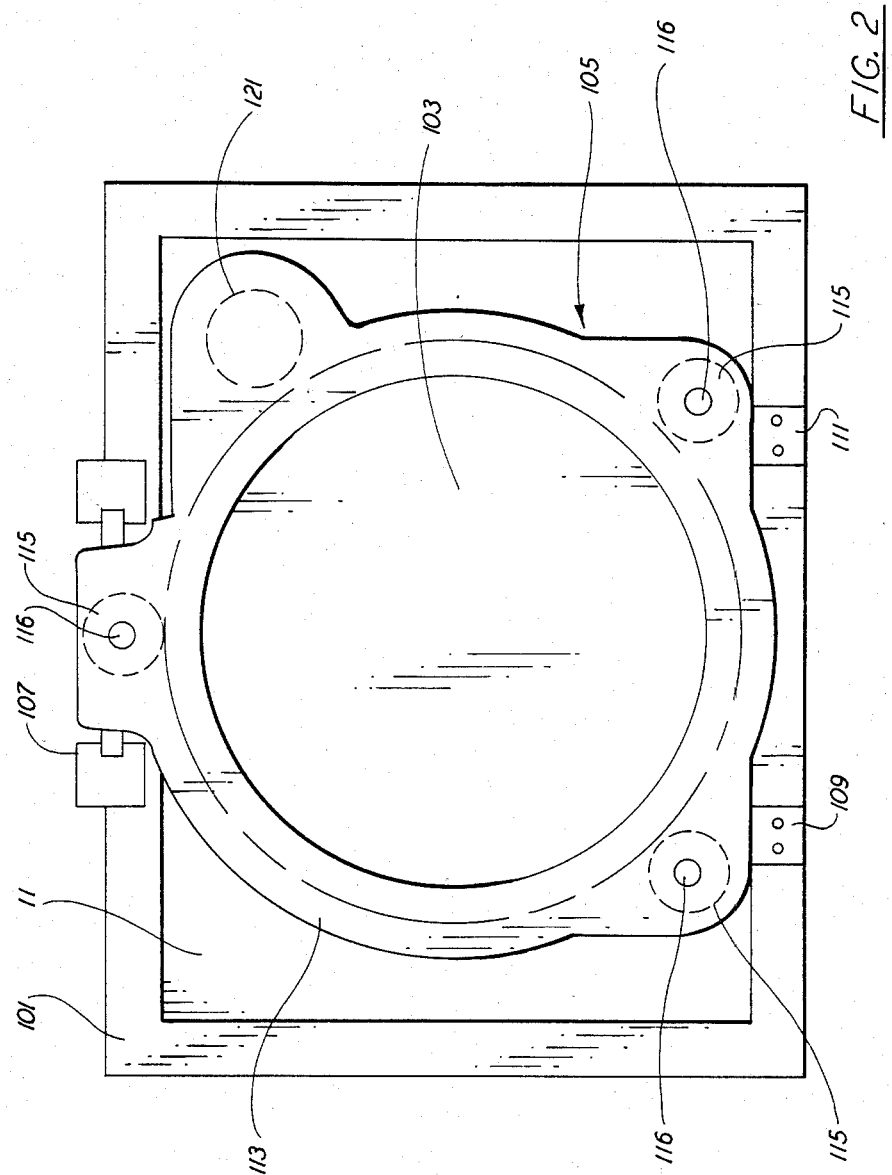
FIG. 2 is a plan view of a second embodiment of clear viewing screen according to the present invention.
Figure 3:
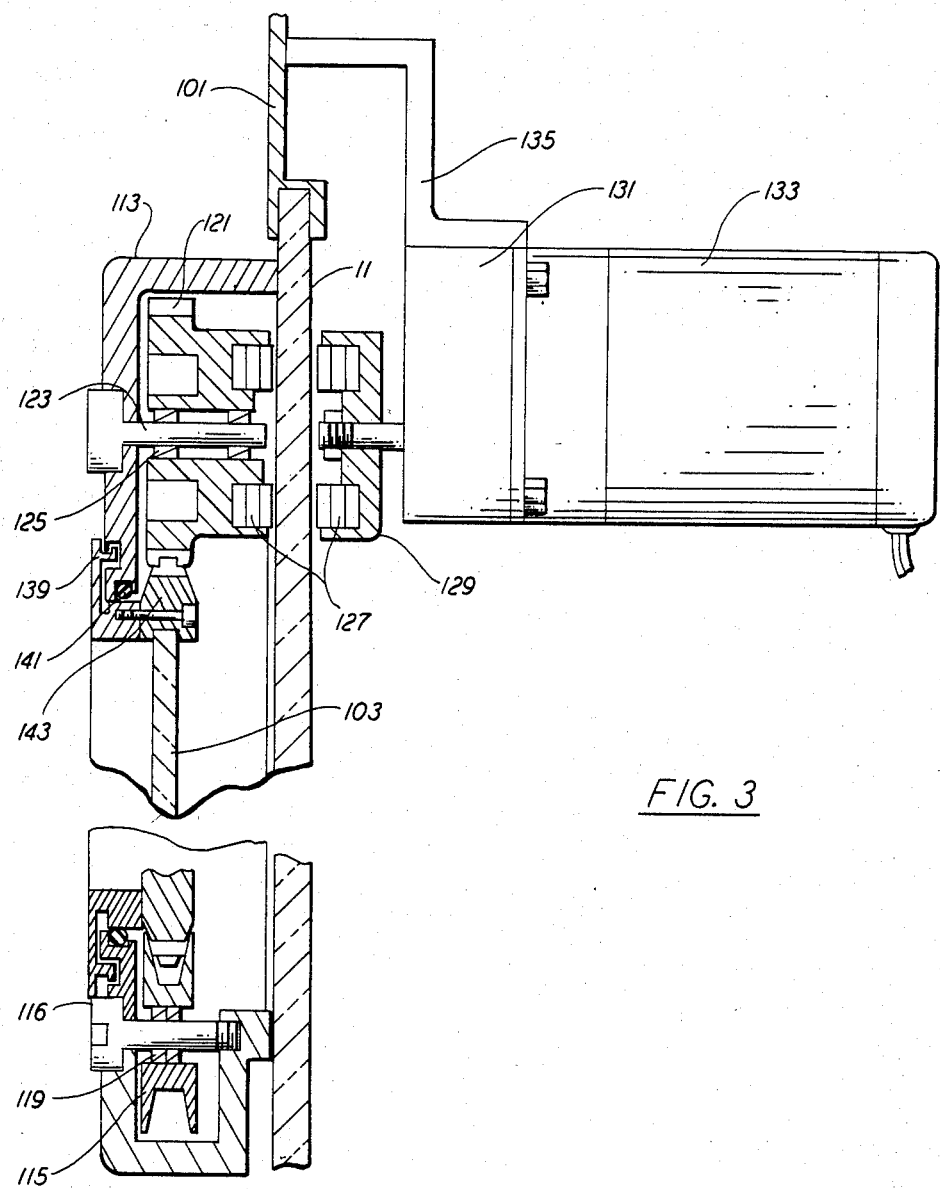
FIG. 3 is a partial cross-sectional view of the embodiment of FIG. 2.

FIGS. 2 and 3 illustrate a second embodiment of the present invention in which the full field of view of the rotating window is available for viewing i.e. there is not blockage in the center due to a motor. Rather, the motor is mounted at the periphery of the spinning window. As with the previous embodiment the coupling is a magnetic coupling and thus there is no hole in the window.

Referring to FIG. 2, a main bridge window 11 for example is shown mounted in a conventional, e.g., 19 by 25 inch window frame 101. Typically the viewing area of the spinning window 103 is on a 16¼ inch diameter. As is evident from FIG. 2 there are no obstructions in the viewing area. The assembly containing the rotating window 103 designated generally as 105 is attached to the window frame 101 by means of a rotating hinge 107 located at the top of the window and flanges 109 and 111 at the bottom of the window. This type of a mounting system of the weather side subassembly provides ease of installation and maintenance. The spinning window 103 mounts to a frame 113 through three cam followers 115, two at the bottom and one at the top, the top cam follower 115 is spring loaded to eliminate manufacturing clearances and provide thermal expansion compensation. As can be seen from the cross-section of FIG. 3, each cam follower is V-grooved to provide a rolling surface for the rotating window and is straddle mounted to frame 113 on a shaft formed by a bolt 116. Double lip-sealed ball bearings 119 are the rolling elements for the cam followers 115.

The window is driven by a drive pinion 121 best seen in the cross-section of FIG. 3. Drive pinion 121 is supported on a shaft 123, which in turn is secured to frame 113, by means of bearings 125. On the side of pinion 121 adjacent the windshield 11 a ring of magnets 127 is mounted. This provides one-half of a magnetic coupling, the other half comprising opposed magnets 127 mounted on a magnet ring 129 attached to the output shaft of a gear box 131 driven by a motor 133. Motor 133 and gear box 131 are supported by a support frame 135 attached to the window frame 101. Also provided at the periphery of the spinning window is a labyrinth seal 139 and a heater coil 141 in conventional fashion. The labyrinth seal 139 is connected to a ring gear 143 which supports the spinning window 103 and in turn is driven by the pinion 121.

The motor 133 may be either a single phase ⅜th horsepower, 115 volt AC motor with internal cooling or an equivalent rated DC motor. The AC motor is preferred for military applications where brush generated EMI should be avoided and the DC motor preferred on smaller vessels where AC voltage is not available. Typically, gear box 131 will be a 2.15/1 step-up driving the magnet ring 129. The magnets 127 may comprise a four pole samarium cobalt magnetic coupling drive. The magnetic coupling can drive through glass thicknesses up to one inch without decoupling during any phase of operation.

Preferably, the pinion 121 will be a 24 tooth bronze pinion, cantilever mounted on the shaft 123 to a bronze frame 113. The gear ring 143 is preferably a bronze ring with 156 teeth. With this arrangement a rotating speed of 1600 rpm can be achieved. The labyrinth seal 139 on the weather side of the spinning window prevents water from entering the enclosed area. Heating coil 141 located outboard of the spinning window and just inside the labyrinth seal 139 melts ice and prevents fog from forming on the fixed and spinning window. The cast bronze mounting frame 113 houses the weather side subassembly and provides a seal between the fixed window viewing area and outside environment.

What is claimed is:

1. In a clear viewing screen comprising: a fixed screen element; a rotatable disk-like screen element; means supporting said disk-like screen element for rotation; an electric motor for driving said disk-like screen element; and means mounting said motor to the fixed screen element, the improvement comprising:

a magnetic coupling having a first coupling half and a second coupling half, said first coupling half coupled to said motor and said second coupling half coupled to said disk-like screen element, said first and second coupling halves disposed opposite each other on opposite sides of said fixed screen element whereby said magnetic coupling will transmit torque from said motor through said fixed screen to said disk-like screen element without the need for a hole in said fixed screen, wherein said means supporting said disk-like element comprises a plurality of cam followers disposed at the periphery of said disk-like element; and wherein said motor is supported at the periphery of said disk-like element and further including a ring gear surrounding said disk-like element; a pinion supported at the periphery of said disk-like element engaging said ring gear, said first and second coupling halves disposed respectively on said pinion and said motor.

2. In a clear viewing screen of the kind comprising a fixed screen element; a rotatable disk-like screen element; means supporting said rotatble disk-like screen element at the outside of said window; a motor for driving said rotatable disk-like screen element; means for supporting said motor at the inside of said fixed screen element; and means coupling said motor to said rotatable disk-like screen element, the improvement comprising:

(a) said motor mounted at the periphery of said rotatable disk-like screen element; and (b) said coupling means, including a magnetic coupling means, having first and second coupling halves, one coupling half coupled to said motor, the other coupling half coupled to said rotatable disk-like screen element, said coupling members disposed opposite each other on opposite sides of said fixed screen element, whereby coupling can take place without making a hole in said fixed screen element, wherein said means supporting said rotatable disk-like screen element comprise cam followers, and wherein said coupling means include, a ring gear surrounding said rotatable disk-like screen element; and a pinion engaging said ring gear, said pinion containing said second half of said coupling means.

3. The improvement according to claim 2 and further including a frame mounting said cam followers and said pinion, said frame hinged to said fixed screen element.

4. Apparatus according to claim 3 and further including a labyrinth seal between said ring gear and said frame.

5. Apparatus according to claim 4 and further including a heating coil in the area of said labyrinth seal.

* * * * *